Aug. 6, 1935.　　　　　E. L. DENNIS　　　　　2,010,479
BICYCLE BASKET
Filed March 12, 1934　　　2 Sheets-Sheet 1
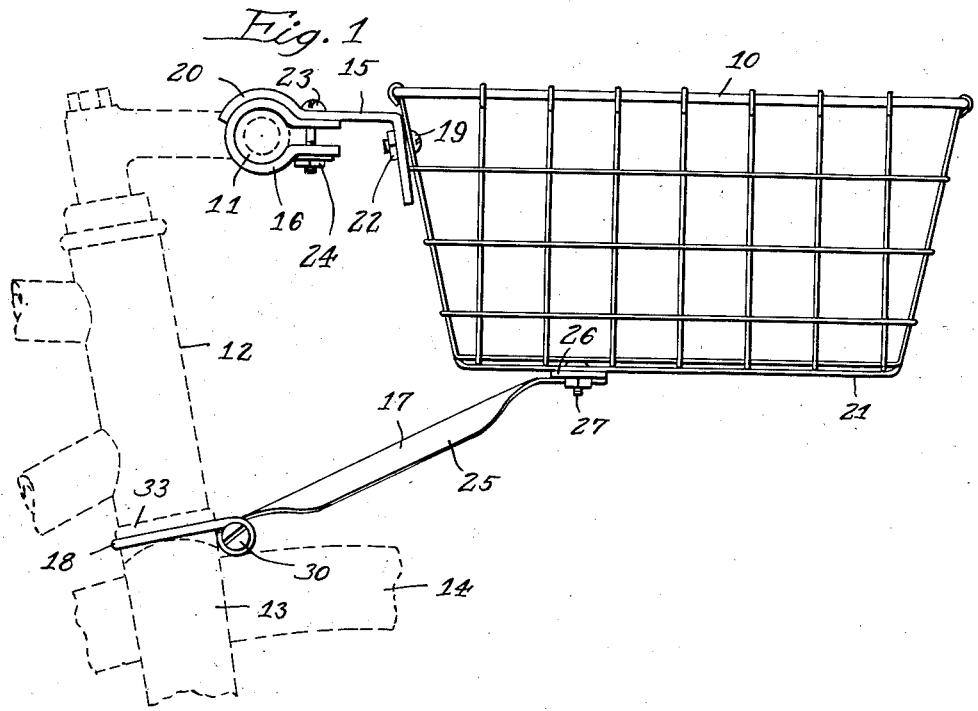
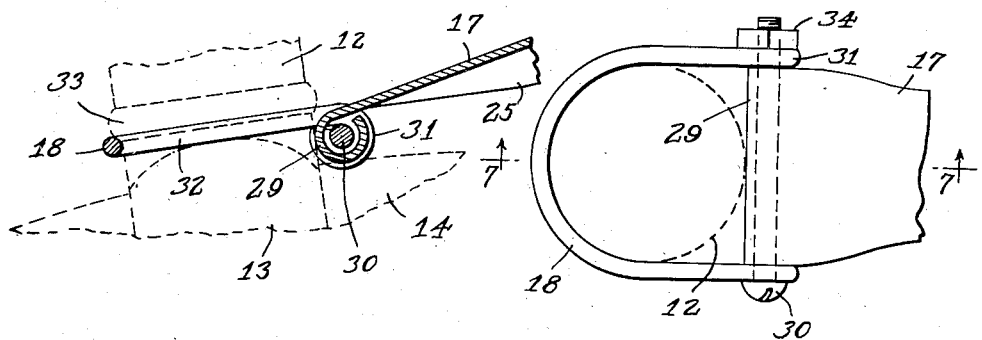
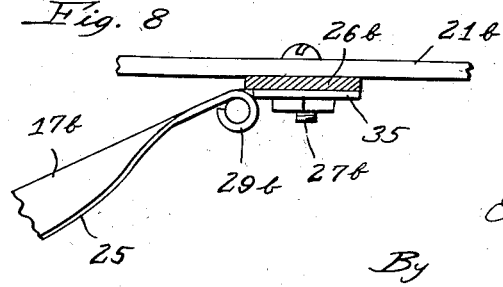
Inventor:
Elmer L. Dennis
By
Wilson, Dowell, McCanna & Wintercorn
Attys.

Aug. 6, 1935. E. L. DENNIS 2,010,479
BICYCLE BASKET
Filed March 12, 1934 2 Sheets-Sheet 2
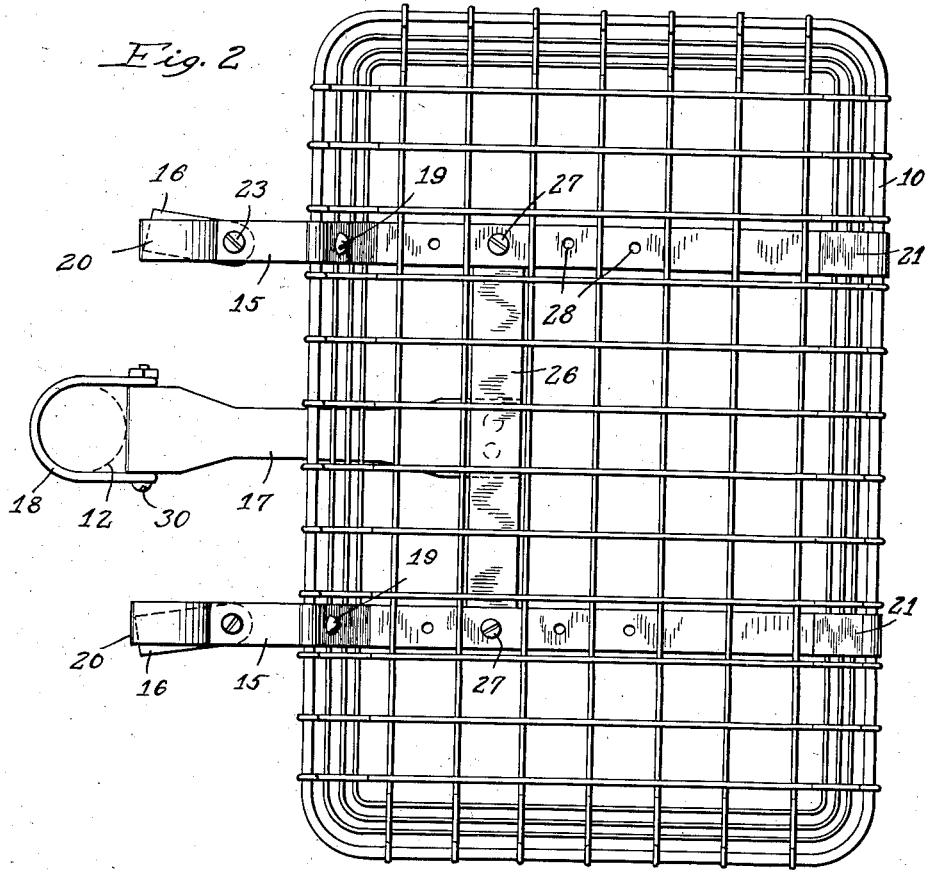
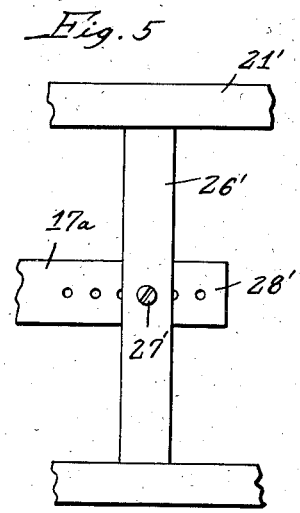
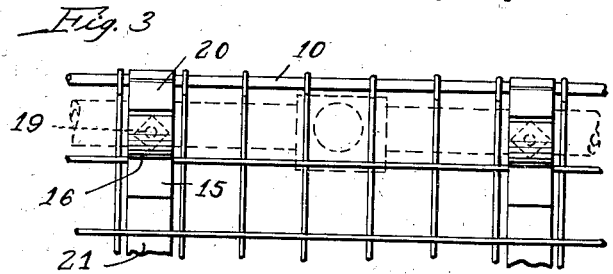
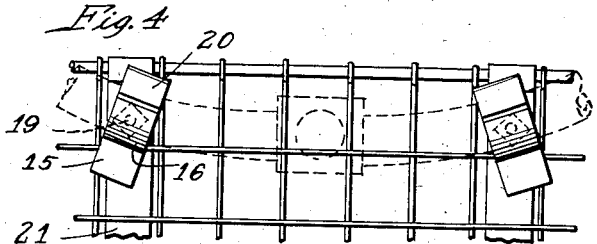

Patented Aug. 6, 1935

2,010,479

UNITED STATES PATENT OFFICE 2,010,479

BICYCLE BASKET

Elmer L. Dennis, Rockford, Ill., assignor to The Washburn Company, Worcester, Mass., a corporation of Massachusetts Application March 12, 1934, Serial No. 715,093

15 Claims. (Cl. 224—32)

This invention relates to bicycle baskets and has for its principal object the provision of a basket which is more rigidly supported on the bicycle without possibility of rattling and in which the objectionable marring of the finish on the bicycle incident to the attachment of the basket is avoided.

One important feature of this basket is the provision of brackets at the top to rest on the handlebar and be fastened thereto by clamping straps of leather or other suitable flexible material, thus affording rigid and non-rattling support and still have the advantage of fastening without marring. The brackets are, furthermore, angularly adjustable with respect to the back of the basket on horizontal axes to fit different shaped handlebars, and the flexibility of the straps further adapts the fastening means to all shapes of handlebars.

Another important feature is the provision of a bottom brace adjustably connected to the bottom of the basket at its forward end to suit requirements, and fastened at the rear end on a U-shaped clamp that fits around the lower end of the bicycle head over the projecting portions of the fork, whereby to hold the rear end of the brace in abutment with the front of the fork and the top of the mud guard for positive support, while the clamp itself is free to turn relative to the head as a bearing, in the oscillation of the fork.

The invention is illustrated in the accompanying drawings, in which—

Figure 1 is a side view of a bicycle basket made in accordance with my invention and shown mounted on the front of a bicycle;

Fig. 2 is a plan view of Figure 1;

Figs. 3 and 4 are fragmentary rear views showing the angular adjustability of the supporting brackets to fit different shaped handlebars;

Fig. 5 is a fragmentary view of a portion of the bottom of a basket showing a modification of the construction of Fig. 2;

Fig. 6 is an enlargement of a portion of Fig. 2 showing the U-shaped clamp for the attachment of the bottom brace;

Fig. 7 is a longitudinal section on the line 7—7 of Fig. 6 showing adjacent portions of the bicycle in side elevation to better illustrate the mode of attachment, and Fig. 8 is a fragmentary view showing a modified form of connection for the forward end of the bottom brace with the basket.

Similar reference numerals are applied to corresponding parts throughout the views.

Bicycle baskets of the kind herein contemplated are used for carrying packages on the handlebar. The basket 10 is shown supported on the handlebar 11 of a bicycle, of which the head 12 and a portion of the front fork 13 and mud guard 14 appear in Figure 1. The present invention, generally stated, is particularly concerned with improved means of attachment at the top to the handlebar 11, consisting of a pair of supporting brackets 15 and correlated clamping straps 16 of leather or other similar flexible material, and an improved bottom brace 17 and means of attachment to the head 12, in the form of a U-shaped clamp 18.

The supporting brackets 15 have downwardly bent front ends fastened to the back of the basket 10 each by means of a single bolt 19 to afford angular adjustability for the brackets with respect to the back of the basket on substantially horizontal axes, whereby to permit moving the hooked rear ends 20 into alignment with the handlebar, whether it requires substantially horizontal positioning as in the case of a horizontal bar, as shown in Fig. 2, or at an angle to the horizontal to fit an inclined bar, as shown in Fig. 4. Any suitable or preferred means of anchoring the bolts on the basket may be provided; in the present case, there are two laterally spaced parallel sheet metal straps 21 forming a part of the basket and extending along the bottom from front to rear and up the front and back walls of the basket and fastened to the top frame, and the bolts 19 are entered through holes in said straps. Nuts 22, threaded on the bolts 19, can be tightened to hold the brackets 15 firmly in adjusted position. The brackets 15 support the weight of the basket and contents on the handlebar and provide stronger and more rigid supports than were afforded where flexible leather straps were relied upon as the sole means of attachment to the handlebar. The leather clamping straps 16 surround the handlebar under the hooked ends 20 of the brackets and are fastened to the brackets by vertical bolts 23. Nuts 24 thread on the bolts and serve, when tightened, to clamp the leather straps on the handlebar and draw the brackets down tightly against the handlebar but with the straps acting as a cushioning and protecting medium. In that way, it is obvious that there is no marring of the plating or other finish on the bar and, furthermore, no such opportunity for rattling as there was when leather straps were used alone. The bolts 23 permit some pivotal movement of the straps 16 relative to the brackets 15, as indicated in Fig. 2, so that the straps can assume whatever positions of angularity with respect to the brackets may be required, due to the shape of the handlebar. In other words, the angular adjustment of the brackets on horizontal axes compensates for different angles of the bar in one plane and the angular adjustment of the straps on substantially vertical axes accommodates different angles of the bar in a transverse plane, and in addition, it is obvious that the flexibility of the leather straps assures their conforming to different shapes of bars, thus affording universal adjustability to suit different models and makes of handlebars.

The bottom brace 17 is formed from a single elongated piece of sheet metal and has downwardly bent longitudinal flanges 25 for stiffening. The front thereof is spot-welded or otherwise suitably secured to a cross-member 26 fastened at its ends by bolts 27 to the straps 21, previously referred to. There are longitudinally spaced holes 28 in these straps permitting the attachment of the cross-member 26 to the bottom of the basket in any one of a series of positions, to suit requirements. The brace is bent down to whatever angle is required to bring the rear end down to the lower end of the head 12 into the angle between the front of the fork 13 and the top of the mud guard 14, as clearly appears in Figs. 1 and 7. The rear end of the brace is curled to form a tubular bearing portion 29 through which a bolt 30 can be entered to fasten the brace 17 to the U-shaped clamp 18. The latter is formed from a piece of round wire having eyelets 31 formed on the ends of the two arms of the U in parallel planes and projecting downwardly from the plane of the clamp, whereby to have the bolt 30 disposed below the clamp and thus hold the rear end of the brace 17 in the position described. The clamp itself fits in the annular recess 32 formed at the lower end of the head 12 below the lower bearing race 33. This annular recess is of different widths on different makes of bicycles, but there is invariably a sufficient recess to accommodate the clamp so that when the nut 34 is tightened on the bolt 30, the clamp cannot possibly slip out of the recess but is nevertheless free to turn therein, as required in the oscillation of the fork 13. Here again, it must be evident that I have provided a more positive form of attachment than was afforded by any of the leather strap attachments heretofore used, and that the basket is accordingly supported more rigidly and without freedom to rattle. Furthermore, this attachment avoids noticeable marring of the finish.

In conclusion, it should be understood that various changes might be made in the construction of the basket itself without sacrificing the advantages of this invention. For example, as shown in Fig. 5, the cross-piece 26 could be replaced by a cross-piece 26' welded or otherwise permanently secured to the straps 21' and having a bolt 27' entered through a hole at the middle to make an adjustable connection with the front end of the brace 17a, by entry in any one of a series of longitudinally spaced holes 28' provided in the front end of said brace. In that way, the brace would have the same range of adjustability, so far as connection with the bottom of the basket is concerned, as is afforded by the construction of Fig. 2, with the additional advantage that only one bolt is required. Furthermore, it is obvious that a single strap like the straps 21 could be provided at the middle of the basket having one or more holes like the holes 28 to make connection with a brace similar to the brace 17a, requiring only a single bolt for the adjustable connection. Then, too, if it is desired to get away from the bending of the bottom brace 17 in order to get the rear end of the brace in proper position with respect to the head of the bicycle, a construction like that of Fig. 8 could be used. The front end of the brace 17b is shown as curled to form a tubular bearing 29b similar to the bearing 29, previously described, arranged to make a hinge connection with a plate 35 fastened to the cross-piece 26b by bolt 27b. The cross-piece 26b, with this construction, would be connected to straps 21b, as in Fig. 2, to permit adjusting the cross-piece to the front or rear relative to the bottom of the basket. It should also be understood that the handlebar fastening herein disclosed is also suitable for use with deeper baskets of that type used for delivery purposes, in which the bottom of the basket is supported by a U-shaped brace straddling the front wheel and connected to the ends of the front axle.

It is believed the foregoing description conveys a good understanding of the objects and advantages of my invention. The appended claims have been drawn with a view to covering all legitimate modifications and adaptations.

I claim:

1. A package carrier for the handlebars of bicycles and the like comprising a receptacle, rigid supporting brackets extending rearwardly from the top portion of the receptacle with the ends thereof arranged to rest on top of the handlebar to support the receptacle and contents, and adjustable flexible members under the rear ends of said brackets interposed between the brackets and bar and arranged to fasten the brackets to the bar in supporting position.

2. A package carrier for the handlebars of bicycles and the like comprising a receptacle, rigid supporting brackets extending rearwardly from the top portion of the receptacle with the ends thereof arranged to rest on top of the handlebar to support the receptacle and contents, and flexible straps of cushioning material attached to the brackets and disposed under the supporting ends of the brackets and encircling the bar, said straps having slack take-up means arranged to be tightened to clamp the bar and hold the supporting ends of the brackets in firm engagement with the bar, but with the straps interposed as cushioning means.

3. A package carrier for the handlebars of bicycles and the like comprising a receptacle, supporting brackets on the back of the receptacle having rigid rearwardly extending portions arranged to engage a handlebar so as to support the receptacle on the bar, and rigid front attaching portions pivoted on the receptacle on substantially horizontal axes for angular adjustability of the rearwardly extending portions of the brackets horizontally relative to the bar to fit different shaped handlebars, and flexible straps of cushioning material on the rear ends of the brackets arranged to be interposed between said ends and the bar for cushioning purposes, and arranged to encircle and be fastened to the bar for detachably securing the brackets to a handlebar.

4. A package carrier for the handlebars of bicycles and the like comprising a receptacle, supporting brackets on the back of the receptacle having rearwardly extending portions arranged to support the receptacle on the handlebar, and front attaching portions pivoted on the receptacle on substantially horizontal axes for angular adjustability of the brackets horizontally to fit different shaped handlebars, an upright bolt extending through each of the rearwardly extending bracket portions, and clamp straps arranged to encircle the bar and each having the free ends pivotally attached to one of said bolts, whereby to provide angular adjustability of the straps on axes in transverse relation to the axes of adjustability of the brackets, to further conform to different shaped handlebars.

5. A package carrier for the handlebars of bicycles and the like comprising a receptacle, substantially horizontal supporting brackets on the back of the receptacle arranged to rest on a handlebar, the same having substantially vertical front attaching portions pivoted on the receptacle on substantially horizontal axes for angular adjustability of the brackets horizontally to fit different shaped handlebars, and attaching means for securing the rear ends of the brackets to the bar, said means being mounted on the rear ends of said brackets for pivotal movement relative thereto on substantially vertical axes in transverse relation to the first-mentioned axes, whereby to adapt the carrier universally to different shaped handlebars.

6. A package carrier for the handlebars of bicycles and the like comprising a receptacle, rigid supporting brackets extending rearwardly from the back of the receptacle having hook-shaped rear ends to fit on top of the handlebar and support the receptacle, flexible straps each bent into a circle to encircle the bar and fit in the hook-shaped end of a bracket with the free ends extending forwardly under the bracket, and bolts passing through said brackets and the free ends of the straps therebeneath and arranged when tightened to draw the hook-shaped ends of the bracket down toward the bar into firm engagement with the straps and also contract the circles formed by the straps, whereby to clamp the handlebar extending therethrough.

7. In a package carrier for bicycles and the like comprising a receptacle having means for attaching the back thereof to a handlebar, a lower support for said receptacle comprising a brace fastened to the receptacle and extending downwardly and rearwardly therefrom into the angle formed by the front of the bicycle head and the top of the mud guard, and a U-fastener rotatable on the lower end of the head in the annular recess between the top of the fork and the lower fork bearing on the head, and detachably secured to the rear end of the brace and holding the same in the position stated.

8. A lower support for a bicycle basket comprising in combination with a basket, a brace fastened at one end to the basket and formed at its other end to provide a transverse tubular portion adapted for engagement with the front of a bicycle fork above the mudguard, and a U-shaped clamp to surround a recessed portion of the bicycle head between the top of the fork and the lower fork bearing on the head, the U-clamp having eyelets on the ends of the arms of the U to register with the opposite ends of the tubular portion of said brace and be so spaced thereby to prevent binding of the arms of the U in the recessed portion, and a bolt passing through the tubular portion and eyelets and serving to detachably secure the clamp and brace together.

9. In a package carrier for bicycles and the like, a receptacle having a pair of substantially parallel metal straps extending front to rear of the bottom and up the back of said receptacle, pivot bolts passed through the upwardly extending portions of said straps, supporting brackets pivotally mounted on the bolts and arranged to engage and be fastened to a handlebar to support the receptacle, said brackets being arranged to be adjusted on the pivots to angles to correspond to the inclination of the portions of the handlebar engaged thereby, a cross-member on the bottom of the receptacle having fasteners at each end for selective entry in any of a series of holes provided in longitudinally spaced relation in said straps for fore and aft adjustment relative to the bottom of the receptacle, and a bottom brace extending from the cross-piece and arranged to engage a portion of the bicycle head to further support the receptacle.

10. In a package carrier for bicycles and the like, a receptacle having a pair of substantially parallel metal straps extending front to rear of the bottom and up the back of said receptacle, pivot bolts passed through the upwardly extending portions of said straps, supporting brackets pivotally mounted on the bolts and arranged to engage and be fastened to a handlebar to support the receptacle, said brackets being arranged to be adjusted on the pivots to angles to correspond to the inclination of the portions of the handlebar engaged thereby, a cross-member on the bottom of the receptacle extending from one of said straps to the other and secured thereto, and a bottom brace extending from an intermediate portion of the cross-piece and arranged to engage the bicycle head to further support the receptacle.

11. A handlebar fastening for a bicycle basket or the like comprising a rigid supporting member having a portion shaped to fit on the bar, and a strap of flexible cushioning material encircling the bar and interposed between the bar and the last named portion of said supporting member, whereby to cushion the engagement thereof on the bar, and a fastener passed through the supporting member and the free ends of said strap and arranged when tightened to cause the strap to grip the bar while causing the last named portion of said supporting member to be drawn toward the bar into tight engagement with the strap.

12. In a package carrier for bicycles and the like, a receptacle having a pair of substantially parallel metal straps extending front to rear of the bottom and up the back of said receptacle, pivot bolts passed through the upwardly extending portions of said straps, supporting brackets pivotally mounted on the bolts and arranged to engage and be fastened to a handlebar to support the receptacle, said brackets being arranged to be adjusted on the pivots to angles to correspond to the inclination of the portions of the handlebar engaged thereby, and other attachment means arranged to extend between the bottom of the receptacle and the bicycle head to further support the receptacle.

13. In a device of the class described, a handlebar fastening comprising a supporting bracket arranged to rest on the handlebar, and an adjustable flexible member under said bracket between it and the bar and arranged to fasten the bracket to the bar in supporting position while cushioning the engagement of said bracket thereon.

14. In a device of the class described, a handlebar fastening comprising a supporting bracket arranged to rest on the handlebar, a flexible strap of cushioning material attached to the bracket and disposed under the bracket between it and the bar to cushion the engagement of the bracket with the bar, and slack take-up means extending between the bracket and a free end of said strap and arranged to be tightened to clamp the bar and hold the bracket in firm engagement therewith.

15. In a device of the class described, a prop for extension into the angle formed by the front of a bicycle head and the top of the wheel, the same comprising a prop member, and a U-fastener rotatable on the lower end of the head in the annular recess between the top of the fork and the lower fork bearing on the head and detachably secured to the end of said prop member to hold the same in the position stated.

ELMER L. DENNIS.